US009106750B2

(12) United States Patent
Klemm et al.

(10) Patent No.: US 9,106,750 B2
(45) Date of Patent: Aug. 11, 2015

(54) FACILITATING A CONTACT CENTER AGENT TO SELECT A CONTACT IN A CONTACT CENTER QUEUE

(71) Applicant: Avaya Inc., Basking Ridge, NJ (US)

(72) Inventors: Reinhard P. Klemm, Basking Ridge, NJ (US); Parameshwaran Krishnan, Basking Rodge, NJ (US); Doree D. Seligmann, New York, NY (US); Navjot Singh, Denville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/971,599

(22) Filed: Aug. 20, 2013

(65) Prior Publication Data

US 2015/0055772 A1 Feb. 26, 2015

(51) Int. Cl.
*H04M 3/523* (2006.01)

(52) U.S. Cl.
CPC .................................. *H04M 3/5233* (2013.01)

(58) Field of Classification Search
CPC ............................ H04M 3/523; H04M 3/5233
USPC .............. 379/265.03–265.09, 265.11–266.03
See application file for complete search history.

(56) References Cited

U.S. PATENT DOCUMENTS

| 5,239,460 | A  | * | 8/1993  | LaRoche ...................... 705/7.42 |
|-----------|----|---|---------|---------------------------------------|
| 5,825,869 | A  | * | 10/1998 | Brooks et al. ............ 379/265.12 |
| 6,829,348 | B1 | * | 12/2004 | Schroeder et al. ....... 379/265.09 |
| 8,150,022 | B2 | * | 4/2012  | Minnich et al. .......... 379/265.06 |
| 8,295,468 | B2 | * | 10/2012 | Jaiswal et al. ............ 379/265.02 |
| 8,422,659 | B2 | * | 4/2013  | Becerra et al. ........... 379/265.12 |
| 2006/0153356 | A1 | * | 7/2006 | Sisselman et al. ....... 379/265.12 |
| 2008/0181389 | A1 | * | 7/2008 | Bourne et al. ........... 379/265.06 |
| 2010/0054431 | A1 | * | 3/2010 | Jaiswal et al. ............. 379/88.04 |
| 2013/0142322 | A1 | * | 6/2013 | Grasso et al. ............ 379/265.08 |
| 2014/0233719 | A1 | * | 8/2014 | Vymenets et al. ....... 379/265.03 |

OTHER PUBLICATIONS

Adsit, D., "Why, Despite Your Best Efforts, Turnover Remains Stubbornly High." http://www.callcentertimes.com/Home/tabid/37/ctl/NewsArticle/mid/395/CategoryID/1/NewsID/386/Default.aspx. Mar. 2013. 2 pgs.

\* cited by examiner

*Primary Examiner* — Harry S Hong
(74) *Attorney, Agent, or Firm* — Sheridan Ross P.C.

(57) ABSTRACT

The system and method enable an agent to be able to select a contact (e.g., a voice call or email from a customer) from a contact queue in a contact center. As contacts come into a contact center, the contacts are placed in the contact queue. An agent in the contact center is presented with the contacts along with a profile that is associated with each of the contacts. The profile may contain information about the contacts such as an attitude of the contact, a conversation style of the contact, a sentiment of the contact, and the like. The agent selects one of the contacts in the contact queue. The selected contact is then sent to the agent for handling.

20 Claims, 5 Drawing Sheets

FACILITATING A CONTACT CENTER AGENT TO SELECT A CONTACT IN A CONTACT CENTER QUEUE

TECHNICAL FIELD

The systems and methods relate to contact centers and in particular to contact center selection systems.

BACKGROUND

While customer satisfaction has been the major focus of contact center systems, another important aspect is rewarding and retaining good agents. High turnover rates among contact center agents have been well documented in the contact center industry. A high agent turnover rate is undesirable for a contact center because it increases the cost for training new agents and can disrupt the contact center operations. Traditionally, rewarding and retaining good agents is accomplished via standard employment tools (e.g., salaries, bonuses and recognitions). While this type of reward system may retain some contact center agents, it has only been marginally successful in retaining contact center agents. What is need is a system that provides a higher level of job satisfaction for contact center agents, thus leading to a lower rate of contact center agent turnover.

SUMMARY

Systems and methods are provided to solve these and other problems and disadvantages of the prior art. The system and method enable an agent to be able to select a contact (e.g., a voice call or email from a customer) from a contact queue in a contact center. As contacts come into a contact center, the contacts are placed in the contact queue. An agent in the contact center is presented with the contacts (or a subset of the contacts in the contact queue) along with a profile that is associated with each of the contacts. The profile may contain information about the contacts such as an attitude of the contact, a conversation style of the contact, a sentiment of the contact, and the like. The agent selects one of the contacts in the contact queue. The selected contact is then sent to the agent for handling.

DETAILED DESCRIPTION

Figure 1:
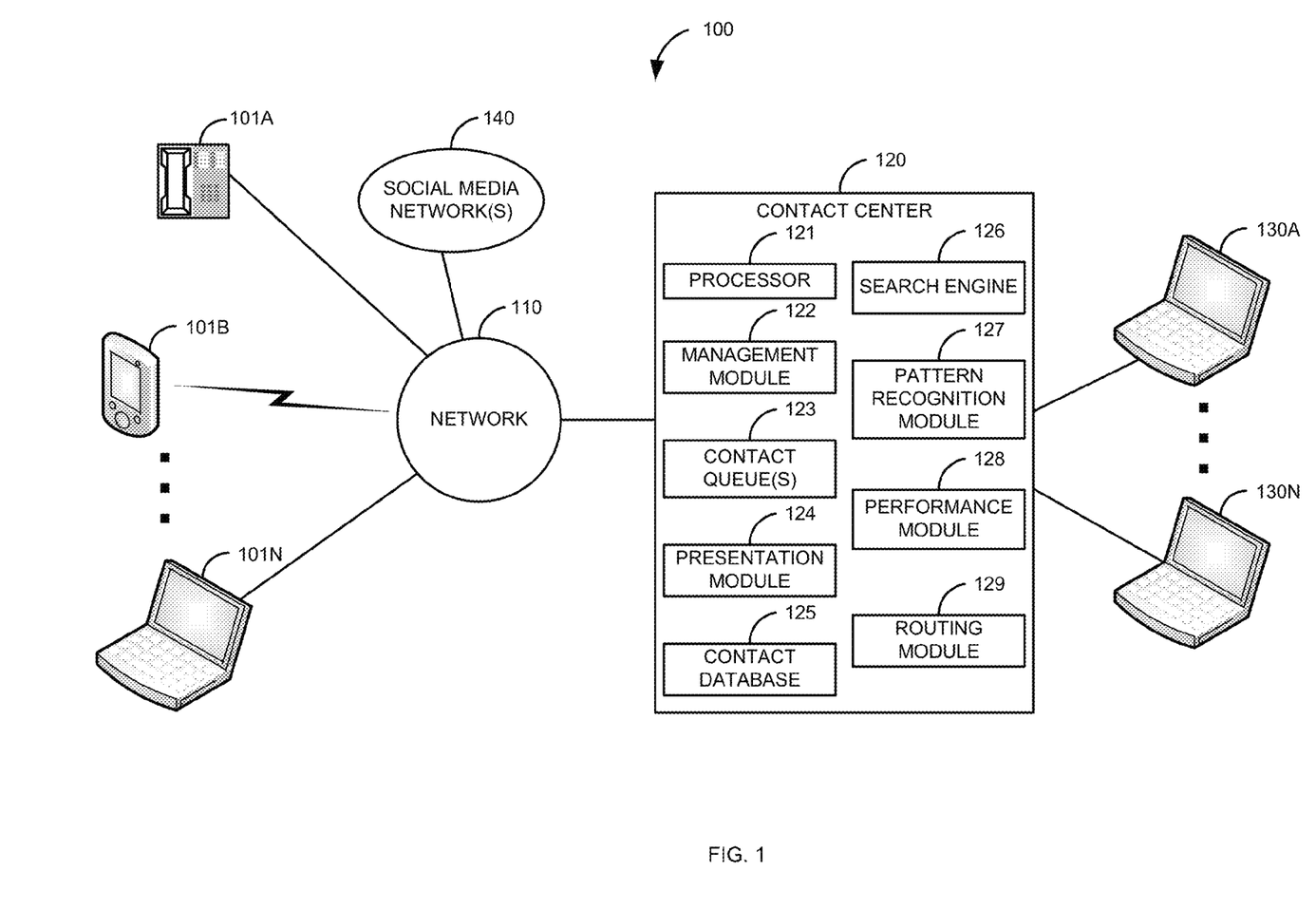
FIG. 1 is a block diagram of a first illustrative system for enabling a center contact agent to select a contact from a contact queue in a contact center.

FIG. 1 is a block diagram of a first illustrative system 100 for enabling a contact center agent to select a contact from a contact queue in a contact center. The first illustrative system 100 comprises communication devices 101A-101N, a network 110, a contact center 120, agent terminals 130A-130N, and social media network(s) 140.

The communication device 101 may be any device that can communicate on the network 110, such as a Personal Computer (PC), a telephone, a video system, a cellular telephone, a Personal Digital Assistant (PDA), a tablet device, a notebook device, and the like. As shown in FIG. 1, any number of communication devices 101A-101N may be connected to network 110, including only a single communication device 101. In addition, the communication device 101 may be directly connected to the contact center 120.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), H.323, and/or the like.

The contact center 120 can be any system that can receive or initiate contacts to or from customers or individuals. For example, the contact center 120 can be a call center, a Private Branch Exchange (PBX), a switching system, an Interactive Voice Response (IVR) system, a communication system, and/or the like. The type of contacts that the contact center can send or receive may be any type of contact, such as voice call, an email, a text message, an Instant Message (IM), a video call, and/or the like.

The contact center 120 further comprises a processor 121, a management module 122, a contact queue(s) 123, a presentation module 124, a contact center database 125, a search engine 126, a pattern recognition module 127, a performance module 128, and a routing module 129. The elements of the contact center (121-129) are shown in a single contact center 120; however, in other embodiments, the various elements of the contact center 121-129 may be distributed. For example, the presentation module 124 may be included in each of the agent terminals 130A-130N.

The processor 121 can be any type of processor, such as a microprocessor, a Digital Signaling Processor (DSP), a microcontroller, a custom processor, and/or the like. The processor 121 is used to manage the contact center 120. The management module 122 can be any hardware/software that can be used to administer the contact center 120.

The contact queue(s) 123 can be any type of contact center queue. The contact queue(s) 123 can be used for incoming contacts or outgoing contacts. The order in which the contacts are placed in the contact queue(s) can vary based on implementation. For instance, the contacts can be ordered based on when the contact was received, based on the type of contact, based on a priority of the contact, based on a caller ID, based on a likely presence of a contact, based on being placed in the contact queue 123 by an auto dialer and/or the like. The contact queue(s) 123 can comprise a single contact queue 123 that can handle contacts of various types of media (e.g., voice, video, email, etc.). The contact queue(s) 123 can comprise separate contact queues for each type of media. The contact queue(s) 123 can support a specific type of product or family of products. The contact queue(s) 123 can be arranged using any combination of the features described above.

The presentation module 124 can be any hardware/software that can present a contact to an agent at the agent terminal 130. The contact center database 125 can be any type of database that stores information, such as a relational database, an object oriented database, a file, and/or the like. The contact center database 125 can be used to store information about previous contacts from a customer, administration information, configuration information, contact profile information, and/or the like.

The search engine 126 can be any hardware/software that can search the social media network(s) 140, the contact database 125, or any information source. The search engine 126 can search the social media network(s) 140 for various types of information about a contact.

The pattern recognition module 127 can be any hardware/software that can recognize a pattern of selected contacts. The performance module 128 can be any hardware/software that can determine an agent's performance in relation to a contact. The routing module 129 can be any hardware/software that can route a contact to an agent, such as a Private Branch Exchange (PBX), a communication system, an email system, an Instant Messaging (IM) system, a text messaging system, a combination of these, and the like.

The agent terminals 130A-130N can be any type of device that an agent can use to process a contact, such as a terminal, the communication device 101, and/or the like. As shown in FIG. 1, any number of agent terminals may be connected to the contact center 120, including only a single agent terminal. In addition, the agent terminals 130A-130N may be connected to the contact center 120 via the network 110 or via a second network (not shown).

The social media network(s) 140 can be any type of social media network, such as a blog site, a Really Simple Syndication (RSS) feed, a social network, and/or the like. For example, the social media network 140 could be Facebook™, Linkedin™ Twitter™, and/or the like.

The management module 122 is configured to enable an agent to be able to select a contact from the contact queue 123. The management module 122 can enable the agent to be able to select a contact in various ways. An administrator may enable the agent to select a contact based on a performance level of the agent. For example, if the agent is achieving a contact center goal of processing 90% of all contacts within five minutes during the last 2 hours, the agent may be automatically be able to select contacts in the contact queue 123 for a period of time as a reward to the agent for meeting the contact center goal. Alternatively, the agent may be able to continue to select contacts from the contact queue 123 based on meeting a goal associated with the contact. For example, the agent may get a small cash reward for handling the contact within an amount of time.

This setting may also be coupled with other setting, such as call volumes, call types, call priority, and/or the like. For example, even though the agent is meeting the contact center goal, the time that the agent will be able to select a contact may be delayed because of a high contact volume in the contact center 120. Alternatively, the enabling of the agent to select a contact may be permanent or can be turned on and off by an administrator or supervisor.

The contact center 120 receives contacts from customers and/or individuals from communication devices 101A-101N. The contact queue(s) 123 receive the incoming contacts from the customers/individuals. In an alternative embodiment, the contacts may be outbound contacts. Once the outbound calls are made, the contacts are received from an auto-dialer (not shown) in the contact queue(s).

Figure 5:
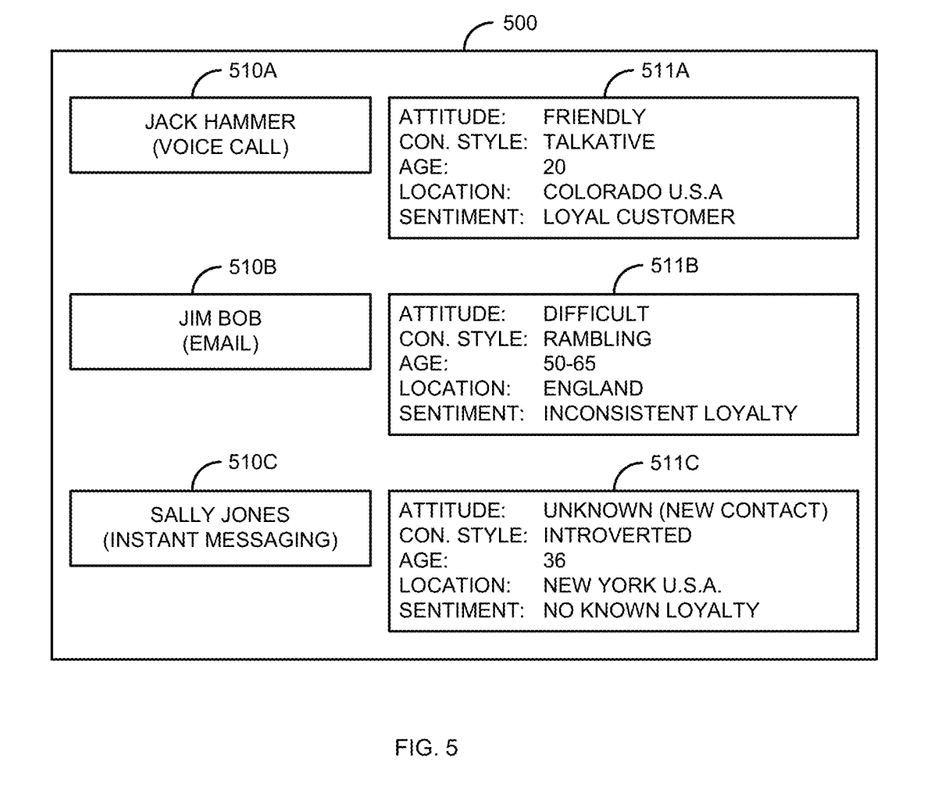
FIG. 5 is a diagram of an agent interface to allow the agent to select a contact from a contact queue.

The presentation module 124 presents to the agent, at one of the agent terminals 130, an individual profile associated with each of the contacts in the contact queue 123 (See FIG. 5 for an illustrative example). The number of contacts presented to the agent may be all of the contacts in the contact queue 123 or may only be a subset of the contacts in the contact center. For example, the presented contacts may include the five contacts that have been in the contact queue 123 the longest. Alternatively, the presented contacts may be based on other attributes, such as a priority of the contact, a product associated with the contact, a media type of the contact, and/or the like.

The individual profile associated with the contact can comprise various types of information associated with the contact, such as an attitude of a contact (e.g. friendly, difficult, abusive, etc.), a conversation style of a contact (e.g., rambling, talkative, introverted, profane, etc.), an age of the contact (e.g., <30, 30-50, 50-65, >65, etc.), a location of the contact (e.g., local, outside agent area, but inside the country, outside the country, etc.), a sentiment of the contact (e.g., highly loyal to the business, no known loyalty to the business, inconsistent loyalty, etc.), a language of the contact (e.g., primary language English, secondary language is Spanish, English only, etc.), social networks of the contact (e.g., Facebook™, Linkedin™, etc.) and/or the like.

The individual profile can be generated in a variety of ways. The individual profile (or parts of the individual profile) can be determined in real-time based on the search engine 126 querying the social media network 140. For example, a customer could initiate a contact to the contact center 120 by clicking on a company site of a social media network 140 where the customer has a personal account. Based on the initiated contact, the search engine 126 can take the customer's handle (which is supplied as part of the contact) and do a search of the customer's personal social network page on the social media network. Based on the information in the customer's social network page, the search engine 126 can determine different characteristics about the customer.

For example, if the customer posts often and the posts are long, the individual profile for the customer could be updated to indicate that the customer's conversation style is talkative and/or detailed. If a lot of other users respond to the customer's posts, the customer's profile may indicate that the customer is influential. The customer's individual profile can indicate that the conversation style is "profane" based on the use of profane language in the customer's posts. The primary language of the customer can also be determined by the language of posts on the customer's social network page.

In other embodiments, the search engine 126 can search the contact database 125 for information about the contact. For example, based on a caller ID of a voice call, the search engine could search the contact database 125 for information about the contact, such as how loyal the customer is. Alternatively, the individual profile can be based on a previous interaction with the contact center 120 by the contact. For instance, the contact database may indicate whether a previous agent thought the contact was friendly or difficult to work with (e.g., based on notes by the agent). The location of the contact may be determined based on the caller ID, GPS information, and/or other information in the contact database 125 and/or the social media networks 140.

In another embodiment, in addition to the contacts and individual profiles, the presentation module 124 can provide other options to the agent, such as an option for free time, coffee break, listening to music for a period of time, playing a game for a short period of time, and/or the like. By providing these types of options, the agent may have a higher overall job satisfaction.

The presentation module 124 receives a selection of one or more of the contacts in the contact queue 123 from the agent. Based on the selection, the routing module 129 sends the selected contact to the agent. The agent can then process the contact.

The agent may only be able to select contacts for a defined period of time. After expiration of the time period, the contacts will automatically be assigned to the agent. The agent may have to reach a contact center goal before being able to select contacts again.

In another embodiment, where the agent selects a plurality of contacts from the contact queue 123 (e.g., over a period of time), the pattern recognition module 127 can determine a pattern of the selected plurality of contacts. For example, if the agent always (or most of the time) selects an individual contact that has "no known loyalty", the system can deduce that the agent prefers these types of contacts. Alternatively, if the agent selects a particular type of contact at the beginning of a shift and a different type of contact at the end of a shift (e.g., an easier contact), the system can deduce that based on a time period into the agent's shift the agent would prefer a specific type of contact. Based on the determined pattern, the pattern recognition module 127 can change contacts that are automatically sent to the agent (i.e., contacts not selected by the agent). For example, based on the pattern, the system can change a volume of contacts automatically sent to the agent, a type of contact automatically sent to the agent, a media of a contact that is automatically sent to the agent, and the like.

In another embodiment, the pattern recognition module 127 determines a pattern of a selected plurality of contacts. In response to a recognized pattern, the pattern recognition module 127 can modify a number of contacts presented to the agent for selection, a type of contact presented to the agent for selection, a type of individual profile presented to the agent for selection, and/or the like.

In another embodiment, the performance module 128 can monitor the performance of the agent in regard to the selected contact. In response to the monitoring, the performance module 128 can modify a number of contacts presented to the agent for selection, a type of contact presented to the agent for selection, a type of individual profile presented to the agent for selection, and/or the like. For example, if the agent handles a specific type of selected contact (e.g., a high value customer) faster than the expected time, the agent can be presented with a larger number of contacts to select from or contacts of the specific type to select from the next time the agent is allowed to select contacts.

In another embodiment, the agent can be allotted points or rewards for choosing a specific customer. For example, the agent could be given an award of five minutes of comp time for selecting a particular contact.

In another embodiment, multiple agents can be presented with the same contact. The agents can then bid on the contact using rewards or points that the agent has accumulated.

Figure 2:
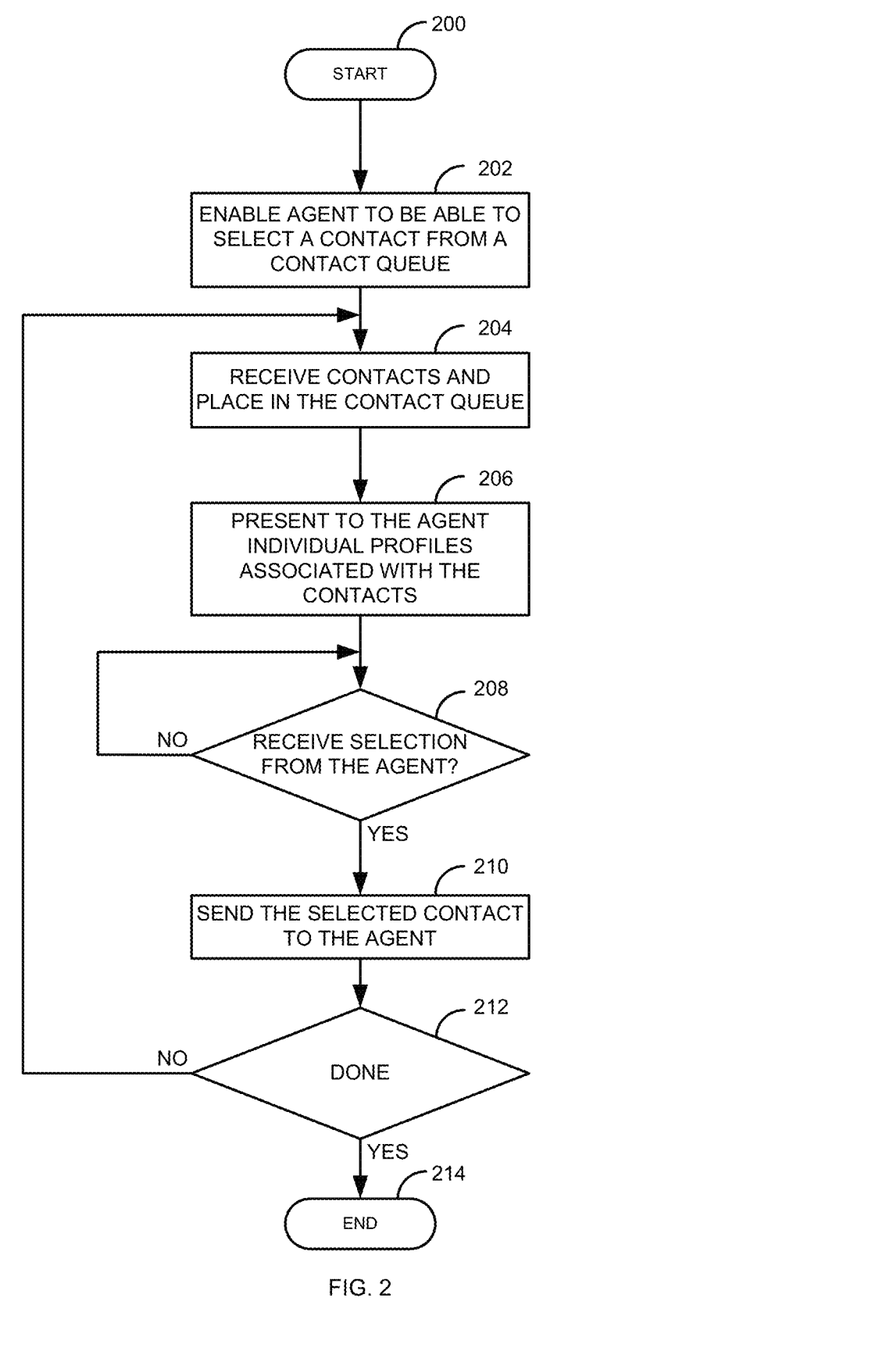
FIG. 2 is a flow diagram of a method for enabling a contact center agent to select a contact from a contact queue in a contact center.
Figure 3:
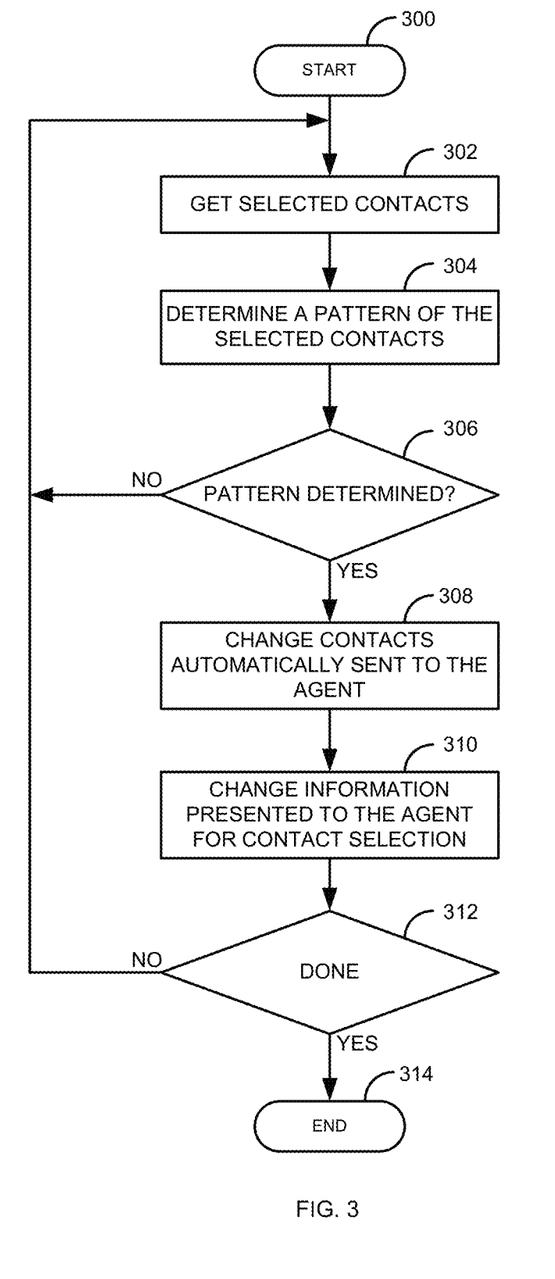
FIG. 3 is a flow diagram of a method for determining a pattern from a plurality of contacts selected by an agent.
Figure 4:
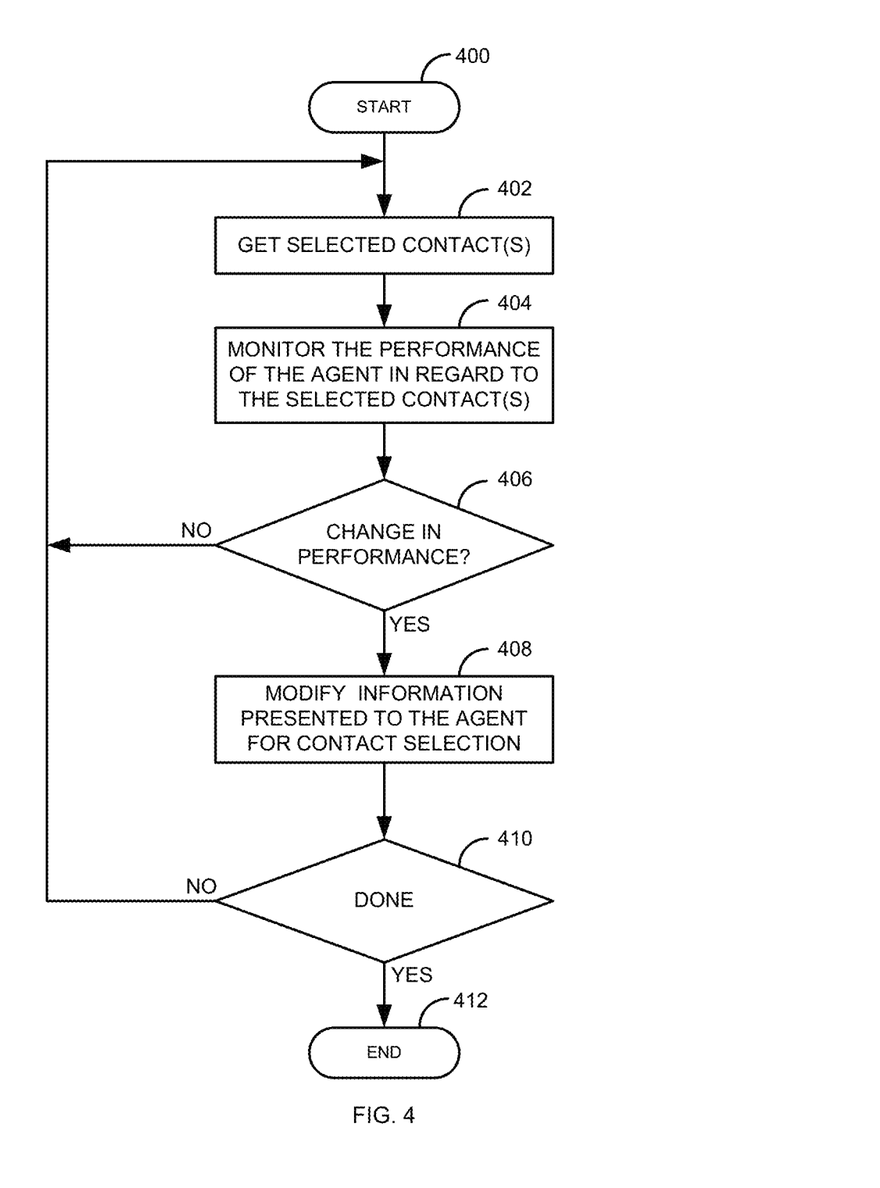
FIG. 4 is a flow diagram of a method for monitoring a performance level of an agent in regard to a selected contact.

FIG. 2 is a flow diagram of a method for enabling a contact center agent to select a contact from a contact queue in a contact center. Illustratively, the communication devices 101A-101N, the contact center 120, the management module 122, the contact queues 123, the presentation module 124, the search engine 126, the pattern recognition module 127, the performance module 128, the routing module 129, and the agent terminals 130A-130N are stored-program-controlled entities, such as a computer or processor, which performs the method of FIGS. 2-4 and the processes described herein by executing program instructions stored in a tangible computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The process enables 202 an agent to be able to select a contact from a contact queue in a call center. The process receives 204 contacts that are placed in the contact queue. The contacts are presented 206 to the agent with the individual profiles that are associated with each of the contacts (See FIG. 5 for an illustrative example).

The process waits in step 208 for the agent to select a contact(s). If a contact is not selected by the agent in step 208, the process repeats step 208. Otherwise, if the agent has selected the contact(s) in step 208, the process sends 210 the selected contact(s) to the agent for handling.

The process determines in step 212 if the process is done. If the process is not done in step 212, the process goes to step 204. The process may go to step 204 based on the agent completing the selected contact. Otherwise, if the process is done in step 212, the process ends in step 214.

FIG. 3 is a flow diagram of a method for determining a pattern from a plurality of contacts selected by an agent. The process starts in step 300. The process gets 302 contacts selected by the agent. The process determines in step 304 if a pattern can be determined from the selected contacts. If a pattern cannot be determined in step 306, the process goes to step 302. Otherwise, if a pattern can be determined in step 306, the process changes 308 the contacts that are automatically sent to the agent.

For example, the process could change the volume of email contacts that are automatically sent to the agent from 50 per day to 45 per day. In one embodiment, the types of contacts that are automatically sent to the agent can be changed. For instance, the system could only send contacts that are loyal to the company based on the pattern. Alternatively, the process could only send voice contacts to the agent instead of Instant Messaging contacts based on the agent always selecting voice contacts.

The process changes 310 the information presented to the agent for contact selection. For example, the system could change the number of contacts presented to the agent for selecting from 5 to 3 based on a pattern of the agent selecting a particular type of contact profile. Alternatively, the process can present only Instant Messaging contacts to the user based on the user always selecting Instant Messaging contacts. In one embodiment, the process can change a type of profile presented to the agent for selection. For example, the process may only present contacts that are talkative and friendly to the agent.

The process determines in step 312 if the process is done. If the process is not done in step 312, the process goes to step 302. Otherwise, if the process is done in step 312, the process ends in step 314.

In FIG. 3, the process shows that both steps 308 and 310 are implemented. However, in alternative embodiments, the process of FIG. 3 may only include one of step 308 or step 310.

FIG. 4 is a flow diagram of a method for monitoring a performance level of the agent in regard to a selected contact(s). The process starts in step 400. The process gets 402 the contact(s) that were selected by the agent. The process monitors 404 the performance of the selected agent in regard to the selected contact(s). For example, the process determines how long the agent takes to handle the selected contact.

The process determines in step 406 if there is a change in performance of the agent for the monitored contacts. For example, the process can compare the performance of the agent for regular contacts (e.g., contacts that were automatically sent to the agent) versus the performance of the agent with the selected contacts. The comparison of performance can be based on previous selected contacts versus the most recently selected contacts.

If there is not a change in performance in step 406, the process goes to step 402. Otherwise, if there is a change in performance in step 406 the process modifies information presented to the agent for contact selection. For example the process can modify a number of contacts presented to the agent for selection, a type of contact presented to the agent for selection, a type of individual profile presented to the agent for selection, and/or the like.

FIG. 5 is a diagram of an agent interface 500 to allow the agent to select a contact 510 from a contact queue 123. FIG. 5 comprises the agent interface 500. The agent interface 500 is what the agent would view in the agent terminal 130 when the agent is presented with the individual profiles associated with the contacts in step 206 of FIG. 2. The agent interface 500 further comprises the contacts 510A-510C and the associated individual profiles 511A-511C. While the agent interface 500 only shows three contacts, one of skill in the art would recognize that any number of contacts can be presented in various ways.

The contact 510A is a voice contact from a contact named Jack Hammer. The contact 510A has an associated profile 511A for Jack Hammer. The associated profile for Jack Hammer is that Jack Hammer is friendly, talkative, age 20, is located in Colorado, U.S.A., and is a loyal customer.

The contact 510B is an email contact from Jim Bob. The contact 510B has an associated profile 511B for Jim Bob. The associated profile for Jim Bob is that Jim Bob is difficult to work with, rambles a lot, is an age between 50 and 65, is located in England, and has an inconsistent loyalty to the company.

The contact 510C is an Instant Messaging contact from Sally Jones. The contact 510C has an associated profile 511C for Sally Jones. The associated profile for Sally Jones is that Sally Jones's attitude is unknown because she is a new contact, is introverted (i.e., based on information from a social media network 140), is age 36, is located in New York, U.S.A., and has no known loyalty.

When the agent is presented with the contacts 510A-510C, the agent can select a contact 510A-510C that the agent would like to handle. The agent may select the contact 510 in various ways, such as based on a mouse click, touching a touch screen, selecting a contact from a menu, and/or the like. The agent can select the contact 510 based on a preference of the agent. For example, if the agent just handled several contacts that were really stressful, the agent may select contact 510A (Jack Hammer) because Jack Hammer is friendly, talkative, and a loyal customer. Alternatively, if the agent gets a higher commission for sales from new contacts, the agent may select Sally Jones because Sally Jones is a new contact.

In FIG. 5, the contacts are shown using different types of contacts (voice, email, and Instant Messaging). However, one of skill in the art would recognize that the types of contacts may all be the same types of contacts.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    enabling, by one or more processors, an agent to be able to select a contact from a contact queue in a contact center, wherein enabling the agent to be able to select the contact from the contact queue is based on a performance level of the agent;
    receiving, by the one or more processors, a plurality of contacts that are placed in the contact queue, wherein the plurality of contacts are electronic communications comprising at least two of a voice call, an email, a text message, an Instant Message (IM), and a video call;
    presenting, by the one or more processors, to the agent, an individual profile associated with each of the plurality of contacts in the contact queue;
    receiving, by the one or more processors, a selection from the agent of one of the plurality of contacts in the contact queue; and
    routing, by the one or more processors, the selected contact, from the contact queue, to the agent.

2. The method of claim 1, wherein the individual profile is determined by querying a social media network of the contact in the contact queue.

3. The method of claim 1, wherein the individual profile is based on a previous interaction of the contact with the contact center.

4. The method of claim 1, wherein presenting the individual profile associated with each of the contacts in the contact queue further comprises an option to give the agent free time.

5. The method of claim 1, wherein the individual profile associated with each of the plurality of contacts comprises at least one of: an attitude of the contact, a conversation style of the contact, an age of the contact, a location of the contact, a sentiment of the contact, a language of the contact, and a social media network of the contact.

6. The method of claim 5, wherein the individual profile associated with each of the plurality of contacts comprises the attitude of the contact, the conversation style of the contact, and the sentiment of the contact.

7. The method of claim 1, wherein the agent selects a plurality of contacts from the contact queue and further comprising:
    determining a pattern of the selected plurality of contacts; and
    in response to determining the pattern of the selected plurality of contacts, changing at least one of: a volume of contacts automatically sent to the agent, a type of contact automatically sent to the agent, and a media type of a contact that is automatically sent to the agent.

8. The method of claim 1, further comprising:
    monitoring a performance level of the agent in regard to the selected one of the plurality of contacts;
    in response to the monitoring of the performance level of the agent in regard to the selected one of the plurality of contacts, modifying at least one of:
    a number of contacts presented to the agent for selection;
    a type of contact presented to the agent for selection; and
    a type of individual profile presented to the agent for selection.

9. The method of claim 1, wherein the agent selects a plurality of contacts from the contact queue and further comprising:
    determining a pattern of the selected plurality of contacts;
    in response to determining the pattern of the selected plurality of contacts, modifying at least one of:
    a number of contacts presented to the agent for selection;
    a type of contact presented to the agent for selection; and
    a type of individual profile presented to the agent for selection.

10. A system comprising:
a management module, executed by one or more processors, configured to enable an agent to be able to select a contact from a contact queue in a contact center, wherein enabling the agent to be able to select the contact from the contact queue is based on a performance level of the agent;
the contact queue configured to receive a plurality of contacts, wherein the plurality of contacts are electronic communications comprising at least two of a voice call, an email, a text message, an Instant Message (IM), and a video call;
a presentation module configured to present to the agent, via a communication device, an individual profile associated with each of the plurality of contacts in the contact queue and receive a selection from the agent of one of the plurality of contacts in the contact queue; and
a routing module, executed by the one or more processors, configured to route the selected contact, from the contact queue, to the agent.

11. The system of claim 10, further comprising a search engine configured to determine the individual profile by querying a social media network of the contact in the contact queue.

12. The system of claim 10, wherein the individual profile is based on a previous interaction of the contact with the contact center.

13. The system of claim 10, wherein the presentation module is further configured to present an option to give the agent free time.

14. The system of claim 10, wherein the individual profile associated with each of the plurality of contacts comprises at least one of: an attitude of the contact, a conversation style of the contact, an age of the contact, a location of the contact, a sentiment of the contact, a language of the contact, and a social media network of the contact.

15. The system of claim 10, wherein the agent selects a plurality of contacts from the contact queue and further comprising a pattern recognition module configured to determine a pattern of the selected plurality of contacts and in response to determining the pattern of the selected plurality of contacts, changing a volume of contacts automatically sent to the agent, a type of contact automatically sent to the agent, and a media type of a contact that is automatically sent to the agent.

16. The system of claim 10, further comprising a performance module configured to monitor a performance level of the agent in regard to the selected one of the plurality of contacts, and in response to the monitoring of the performance level of the agent in regard to the selected one of the plurality of contacts, modify at least one of: a number of contacts presented to the agent for selection, a type of contact presented to the agent for selection, and a type of individual profile presented to the agent for selection.

17. The system of claim 10, wherein the agent selects a plurality of contacts from the contact queue and further comprising a pattern detection module configured to determine a pattern of the selected plurality of contacts and in response to determining the pattern of the selected plurality of contacts, modify at least one of: a number of contacts presented to the agent for selection, a type of contact presented to the agent for selection, and a type of individual profile presented to the agent for selection.

18. A non-transitory computer readable medium having stored thereon instructions that cause a processor to execute a method, the method comprising:
instructions to enable an agent to be able to select a contact from a contact queue in a contact center, wherein the instructions to enable the agent to be able to select the contact from the contact queue are based on a performance level of the agent;
instructions to receive a plurality of contacts that are placed in the contact queue, wherein the plurality of contacts are electronic communications comprising at least two of a voice call, an email, a text message, an Instant Message (IM), and a video call;
instructions to present to the agent, an individual profile associated with each of the plurality of contacts in the contact queue;
instructions to receive a selection from the agent of one of the plurality of contacts in the contact queue; and
instructions to route the selected contact, from the contact queue, to the agent.

19. The non-transitory computer readable medium of claim 18, wherein the individual profile is determined by querying a social media network of the contact in the contact queue.

20. The non-transitory computer readable medium of claim 18, wherein the individual profile is based on a previous interaction of the contact with the contact center.

* * * * *